United States Patent
Schultz et al.

(10) Patent No.: US 8,391,159 B2
(45) Date of Patent: Mar. 5, 2013

(54) ERROR DETECTION AND RECOVERY IN A DIGITAL MULTIMEDIA RECEIVER SYSTEM

(75) Inventors: Mark Alan Schultz, Carmel, IN (US); Brian David Bajgrowicz, Marion, IN (US); Steven Francis Fraser, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 436 days.

(21) Appl. No.: 12/733,216

(22) PCT Filed: Aug. 12, 2008

(86) PCT No.: PCT/US2008/009615
§ 371 (c)(1),
(2), (4) Date: Feb. 16, 2010

(87) PCT Pub. No.: WO2009/023183
PCT Pub. Date: Feb. 19, 2009

(65) Prior Publication Data
US 2010/0142400 A1     Jun. 10, 2010

Related U.S. Application Data

(60) Provisional application No. 60/964,464, filed on Aug. 13, 2007.

(51) Int. Cl.
*G06F 11/00* (2006.01)
(52) U.S. Cl. ...................................... 370/241
(58) Field of Classification Search .................. None
See application file for complete search history.

(56) References Cited

U.S. PATENT DOCUMENTS

| 6,804,244 | B1 | 10/2004 | Anandakumar et al. |
| 2002/0149675 | A1 | 10/2002 | Abraham et al. |
| 2003/0103483 | A1* | 6/2003 | Joshi et al. ................. 370/338 |
| 2006/0215596 | A1 | 9/2006 | Krishnaswamy et al. |

FOREIGN PATENT DOCUMENTS

| EP | 1729529 | 12/2006 |
| EP | 1763173 | 3/2007 |

OTHER PUBLICATIONS

Kriebel: "Digitale SAT-Aufbereitung," Funkschau, Weka Fachzietschriften Verlag, Poing, DE, vol. 71, No. 12, May 29, 1998, pp. 45-49.
ITU-T Standard H.222.0: "Information technology—Generic coding of moving pictures and associated audio information: systems," ITU-T Standard in Force (I), International Telecommunications Union, Geneva, CH, Feb. 1, 2000.
ETSI Standard TR 101 290: "Digital Video Broadcasting (DVB); Measurement Guidelines for DVB Systems," No. V1.2.1, May 1, 2001.
Schulzrinne et al.: "RTP: A Transport Protocol for Real-Time Applications; rfc1889.txt," IETF Standard, Internet Engineering Task Force, Jan. 1, 1996.
International Search Report, dated Jan. 13, 2009.

* cited by examiner

*Primary Examiner* — Kevin C Harper
(74) *Attorney, Agent, or Firm* — Robert D. Shedd; Paul P. Kiel

(57) ABSTRACT

A method for detecting errors in a digital multimedia receiver system is disclosed including the steps of receiving a packetized bitstream representing a video program from at least one of a plurality of transponders in the receiver system, the packetized bitstream periodically including a marker packet having data relating to a continuity counter value, and counting each occurrence of the marker packet in a first counter. The continuity counter value is evaluated at the occurrence of each counting and a second counter is incremented if each continuity counter value is one higher than a previously evaluated continuity counter value. It is determined whether a valid bitstream is being received by comparing values of the first and second counters at predetermined time intervals.

12 Claims, 3 Drawing Sheets

ERROR DETECTION AND RECOVERY IN A DIGITAL MULTIMEDIA RECEIVER SYSTEM

CROSS REFERENCE TO RELATED APPLICATIONS

This application claims the benefit, under 35 U.S.C. §365 of International Application PCT/US2008/009615, filed Aug. 12, 2008, which was published in accordance with PCT Article 21(2) on Feb. 19, 2009 in English and which claims the benefit of U.S. provisional patent application No. 60/964,464, filed Aug. 13, 2007.

TECHNICAL FIELD

The present invention generally relates to satellite receiver systems, and more particularly, to a system and method for monitoring and detecting signal errors in a satellite transponder system and determining when to automatically reset the system if errors are detected.

BACKGROUND

Digital multimedia receiver systems, such as satellite receivers, are subject to momentary signal loss due to rain fade, and other sources of interference. Rain fade as well as other types of interference ultimately have the same effect—they cause the satellite system to lose some of its normal signal level. This discontinuous signal can cause problems in system timing and in the data processing due to short packets. When a problem occurs, the receiver may continue to send data out of memory but it may be repeating packets that are incomplete, contain errors, or are timed incorrectly.

Discontinuous transport signals are often a problem for a receiver. For example, rain fade in a satellite system causes momentary discontinuities of the received signal and may lock up the system. The output of the system may look like it is still sending valid packets but the packets may be timed incorrectly, or may comprise the wrong length, repeated packets from an earlier reception, or out of order packets. This is primarily due to the loss of synchronization between the read and write pointers inside large memory buffers. Detection of this loss of synchronization can be difficult without decoding the video and actually examining the resultant pictures or lack of pictures due to errors.

In normal consumer receivers that have satellite dishes on the property, the consumer can reset the system by unplugging the receiver or pushing a reset button to restart the receiver to clear the memory of the bad data. On professional systems, such as servers for apartment buildings (MFH3—multi-family housing gateway) and airplanes (Live TV™), the satellite receiver is located in a main signal room or some other location where the end consumer does not have control of or access to the box. In such situations, the consumer would have to call in the service provider to have the server reset, which is often inconvenient, time-consuming and in some cases not possible without disrupting the entire service. This can occur in any server application where the transport stream is repackaged and sent out over a wireless connection, a distribution center, or the Ethernet.

SUMMARY

In one embodiment according to the present principles, a system and method is provided for monitoring the operation of a satellite transponder by monitoring each marker packet periodically sent from each transponder to determine, e.g., if the marker packets are arriving in a timely manner and if each packet received is in a correct order.

A system and method according to the present principles shows how to detect when errors in a data flow occur and how to automatically determine if and when the system needs to be reset via software to allow the system to work again and proper data flow to be restored.

According to one aspect, satellite marker packets are used to monitor the reception of the transport stream. The marker packets are periodically sent from each transponder and are preferably sent in a clear (unencrypted) format. A continuity counter is provided and checked over a certain minimum time period to make sure the packets are in the proper order with the appropriate timing. If it is determined that errors are occurring, one solution to this detected problem is to reset the tuner(s) to see if a tuner lockup is the problem. The system or portions of the system may be reset accordingly when it is determined that errors are occurring. However, if the tuner is reset but still creates differences in the count values of the marker packets, then it may be deduced that other problems such as rain fade may be the cause.

In one aspect of the present principles, a method for detecting errors in a digital multimedia receiver system is provided comprising the steps of receiving a packetized bitstream representing a video program from at least one of a plurality of transponders in the receiver system, the packetized bitstream periodically including a marker packet having data relating to a continuity counter value, counting each occurrence of the marker packet in a first counter, evaluating the continuity counter value at the occurrence of each counting and incrementing a second counter if each continuity counter value is higher than a previously evaluated continuity counter value, and determining that a valid bitstream is being received by comparing values of the first and second counters at predetermined time intervals.

According to another aspect, a system for detecting errors in a digital multimedia receiver system comprising a transport processor for receiving a packetized bitstream representing a video program from at least one of a plurality of transponders in the receiver system, the packetized bitstream periodically including a marker packet having data relating to a continuity counter value, a first counter for counting each occurrence of the marker packet in a first counter, a second counter for evaluating the continuity counter value at the occurrence of each counting, wherein the second counter is incremented if each continuity counter value is higher than a previously evaluated continuity counter value; and a comparator module for determining that a valid bitstream is being received by comparing values of the first and second counters at predetermined time intervals.

These, and other aspects, features and advantages of the present principles will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

Figure 1:
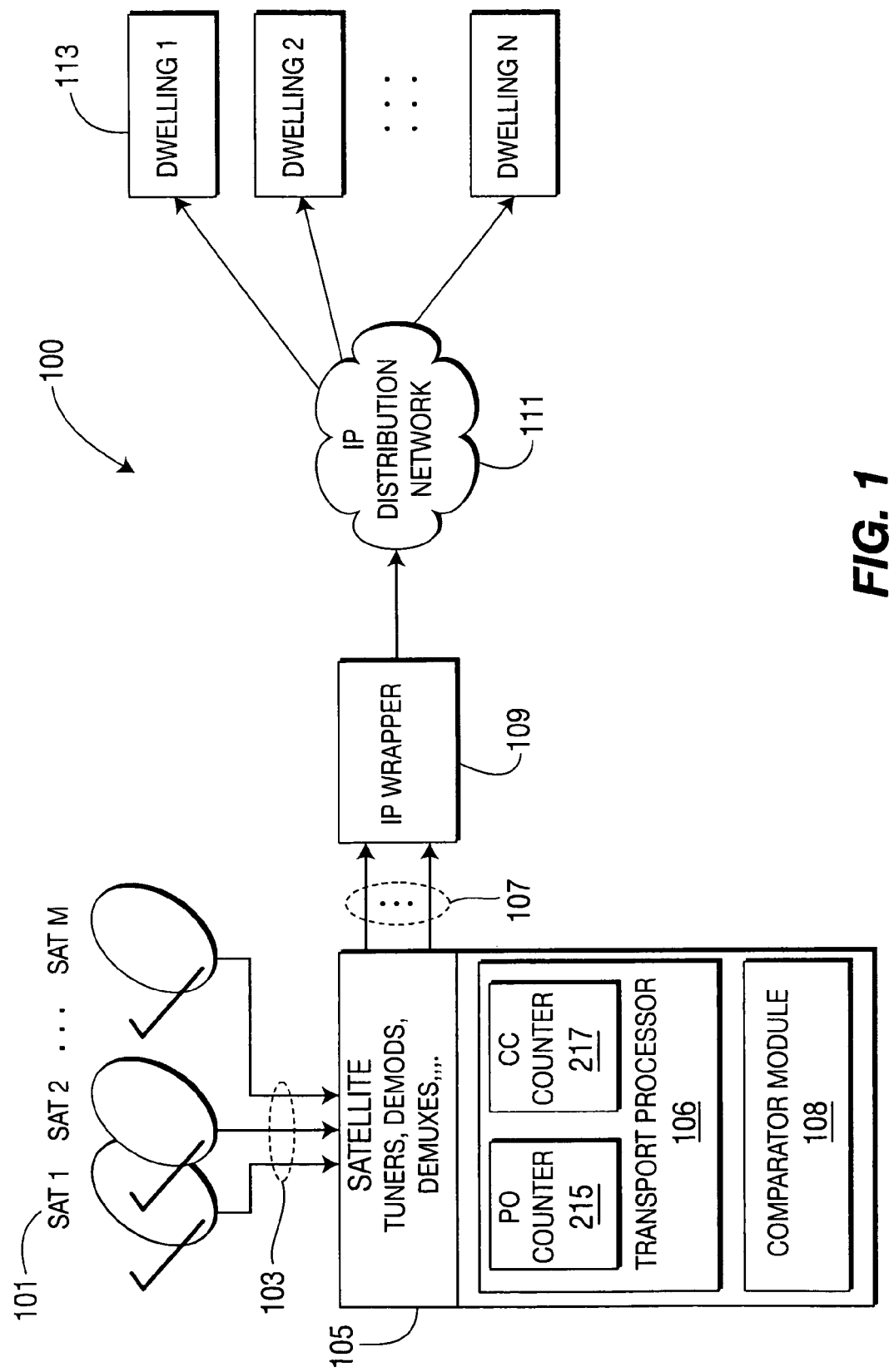
FIG. 1 is a block diagram of an exemplary satellite system setup and data flow therethrough to a plurality of users in apartment dwellings.

It should be understood that the drawings are for purposes of illustrating the concepts of the present principles and are not necessarily the only possible configurations for illustrating the present principles.

DETAILED DESCRIPTION OF PREFERRED EMBODIMENTS

A method, apparatus and system for monitoring the operation of a satellite transponder in a satellite receiver system is advantageously provided according to various aspects of the present principles. Although the present principles will be described primarily within the context of a satellite receiver monitoring system and method, the specific embodiments of the present principles should not be treated as limiting the scope of the invention. It will be appreciated by those skilled in the art and informed by the teachings of the present principles that the concepts of the present principles can be advantageously applied in any other environment in which a signal monitoring function is desired.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that any block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Advantageously, according to one aspect of the present principles, a system and method for a satellite transponder monitoring system with improved efficiency and accuracy is heretofore provided. The system and method according to the present principles may advantageously be incorporated and utilized in any satellite system in need of monitoring actions, such as e.g., consumer systems having satellite dishes on each user's property, or professional systems, such as those for apartments and airplanes.

Referring now to the Figures, FIG. 1 is a block diagram of an exemplary satellite system 100 setup and data flow therethrough to a plurality of users, e.g., in a multi-dwelling complex such as an apartment building. Signals from various satellites 101 are received and processed via a processing center 105 which may include satellite tuners, demodulators, demultiplexers, etc., as well as a transport processor 106 and a comparator module 108. The processes of general satellite signal processing and distribution are well-known and may be performed in accordance with any existing or desired methodology or system.

The transport processor 106 includes a Packet Identifier (PID) Occurrence Counter (PO Counter) 215 and a Contiguous Continuity (CC) Counter 217 for performing monitoring and status reporting of selected marker packets in accordance with an aspect of the present invention, discussed further below with respect to FIG. 2. The transport processor 106 further includes a comparator module 108 for accessing the counters 215, 217 to monitor their status by comparing their respective count values, further described below with reference to FIG. 3.

Transport streams 107 are re-packaged into an IP (Internet Protocol) stream via IP wrapper 109. The Internet Protocol (IP) is a protocol used for communicating data across a packet-switched internetwork using the TCP/IP suite of protocols. IP is the primary protocol in the Internet Layer of the Internet protocol suite and has the task of delivering datagrams (packets) from the source host to the destination host solely based on its address. The IP streams are then routed via IP distribution network 111 to each dwelling 113. Each dwelling 113 includes at least one IP set top box receiver (not shown) to decrypt and decode the content.

Figure 2:
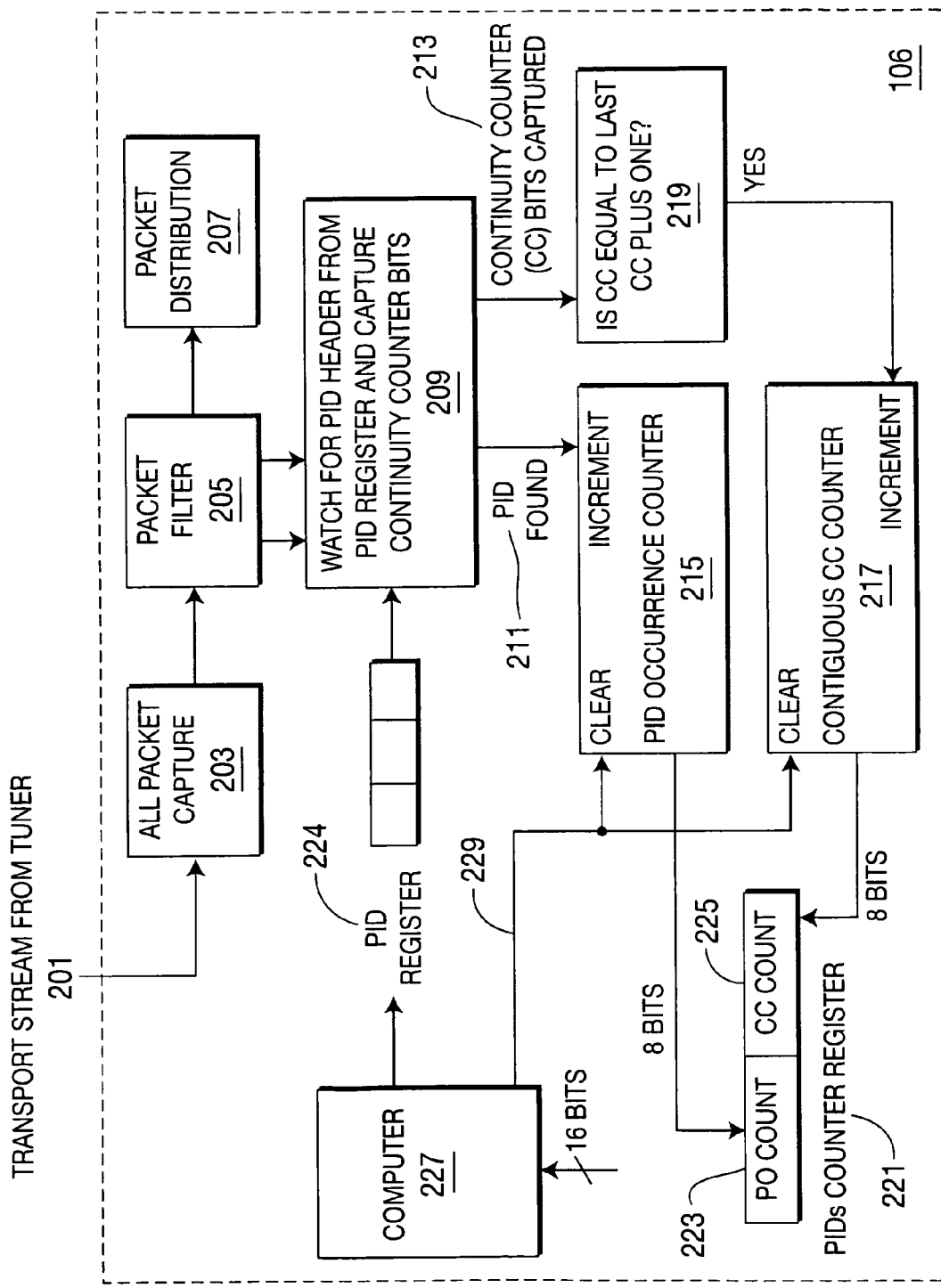
FIG. 2 is an exemplary schematic diagram depicting exemplary hardware components for tracking monitored packet identifiers according to an aspect of the present principles.

FIG. 2 is a schematic diagram depicting exemplary hardware components of a transport processor for tracking and monitoring marker packets and reporting their status according to an aspect of the present principles.

A system and method according to the present principles advantageously may use signals transmitted by a signal source, e.g., such as those sent as part of the DirecTV™ system specification, to monitor the operation of a satellite transponder. Periodically, for example, every three seconds, the transponder sends a marker packet to confirm which transponder is being tuned in. According to an aspect of the present invention, we monitor this marker packet continuously on each transponder and determine if these packets are arriving in a timely manner and if each packet received is in the correct order. An order determination algorithm uses the continuity counter of the transport packets, which in accordance with a preferred embodiment of the present principles, is preferably not scrambled (i.e., is unencrypted). In some prior systems, certain video packets are scrambled and have the continuity counter values scrambled, such that simple packet sequence checking cannot occur until the packets are descrambled. However, such systems also include unscrambled packets, including the marker packets, which can be used to implement the present principles. In a distribution server system like MFH3 (multi-family housing gateway), the packets are being redistributed and go out unchecked for continuity.

Referring now to FIG. 2, a transport stream 201 (e.g., received from a satellite tuner) is input to a packet capture module 203 which sends the captured packets to packet filter module 205. The filter module 205 forwards the packets to a packet distribution module 207 for routing to users.

The transport processor 106 constantly monitors the datastream for packets having the selected PID (e.g., marker packets) using, e.g., the packet filter module 205. When a desired transport packet is identified, the transport processor captures the continuity counter values (at box 209) included with that transport packet. The PID register 224 provides the PID value which is desired to be evaluated. The desired PID value may be determined by computer 227.

Two counters are used to record and report the status of each marker packet: the PID Occurrence Counter 215, which counts the selected (marker) packets received (arrow 211), and the Contiguous Continuity (CC) Counter 217, which is only incremented when it is determined that the received/captured marker packet's continuity count 213 is one higher than the previous marker packet's continuity count (box 219), i.e., when the received packet's CC count=(previous packet's CC count+1). The previous marker packet's continuity count may comprise the continuity count value of a directly preceding marker packet. The continuity count 213 is recorded, e.g., as "CC_Count" 225 in a PID Counter Register 221.

The PID Occurrence Counter 215 is incremented with every PID match found 211 from an incoming packet. That is, each matching PID that is found (211) results in the PO Counter 215 being incremented. The incremented count is recorded in the PID Counter Register 221 as "PO_Count" (223). Preferably, this event is independent of the CC value 213. Further, the PID Occurrence Counter 215 preferably stores the number of packets with this defined PID value for only a certain time period. It is desirable to have enough samples stored to assess and filter out noise yet not burden the software with too many checks. For example, in the case where marker PIDs come in at 3 second intervals and we are using 8 bit counters (0-255 counts), we may use a threshold of 200 counts, that is 200×3 seconds=600 seconds which equals to 10 minutes. Thus, e.g., satellite marker PID counter values may be stored for 10 minute intervals before they are cleared.

The CC count 225 is the continuity counter value on the present packet which is assessed and stored each time a packet arrives with the requested PID value. To illustrate, suppose the present packet received has a CC value set at some value, X. The next packet coming in should have the value of X+1. If it does, the Contiguous CC Counter 217 is incremented by one and the data flow is presumed to be operating normally.

If it does not, the CC counter 217 is not incremented. However, the CC Bits (value) is still captured (213). This captured value (e.g., value Y), is then compared with the CC counter value in the next packet which should be Y+1. If so, the Contiguous CC Counter 217 is incremented. If not, the CC Counter 217 is not incremented, yet the CC value is still captured 213, and so on and so forth. Preferably, this process of checking marker packets is performed at predetermined time intervals, which may be determined based on, e.g., whether the system is in a monitoring mode or a 'problem' mode. Typically, when in a system monitoring mode, a reduced number of checks is desired, whereas in a 'problem mode' (i.e., where a known problem exists, and/or a reset is desired to be performed) a more frequent number of checks is desirable. Thus the predetermined time interval for a monitoring mode preferably comprises a longer period of time than the predetermined time interval for the problem mode.

For example, the above mentioned time interval of 10 minutes may comprise an exemplary time period during which checks may be performed when in a monitoring mode. When in a problem mode, checks may be performed at more frequent intervals, such as, e.g., 30 seconds. Advantageously, this avoids resetting the counters each time the value is different, which would result in overly frequent and unnecessary number of resets being performed. By running the counters over a longer period of time, a much larger difference can be accumulated. This would show that there is a genuine data flow problem rather than a difference of one or two packets that might have had errors due to minor problems such as noise or some other disturbance, such as an initialization error.

In other words, if a known problem exists, the time interval during which marker packets are checked may be decreased to a shorter time period so that a signal isn't lost for long if it turns out that equipment problems exist. For example, a one minute interval would get a count of 20 which could be used. If it is a rain fade problem, while it might not be possible to receive a signal that is blocked by the atmosphere it may be possible to recover the system from any lockups that might occur from a disjointed signal appearing and then disappearing.

The PID Counter Register results 221 are sent to a computer 227 which forwards them for comparison against the next incoming packet. In addition, the PID Counter Register 221 may be analyzed via a comparator module 108 to see if the CC count 225 is equal to the PO count 223, discussed further below with reference to FIG. 3.

Figure 3:
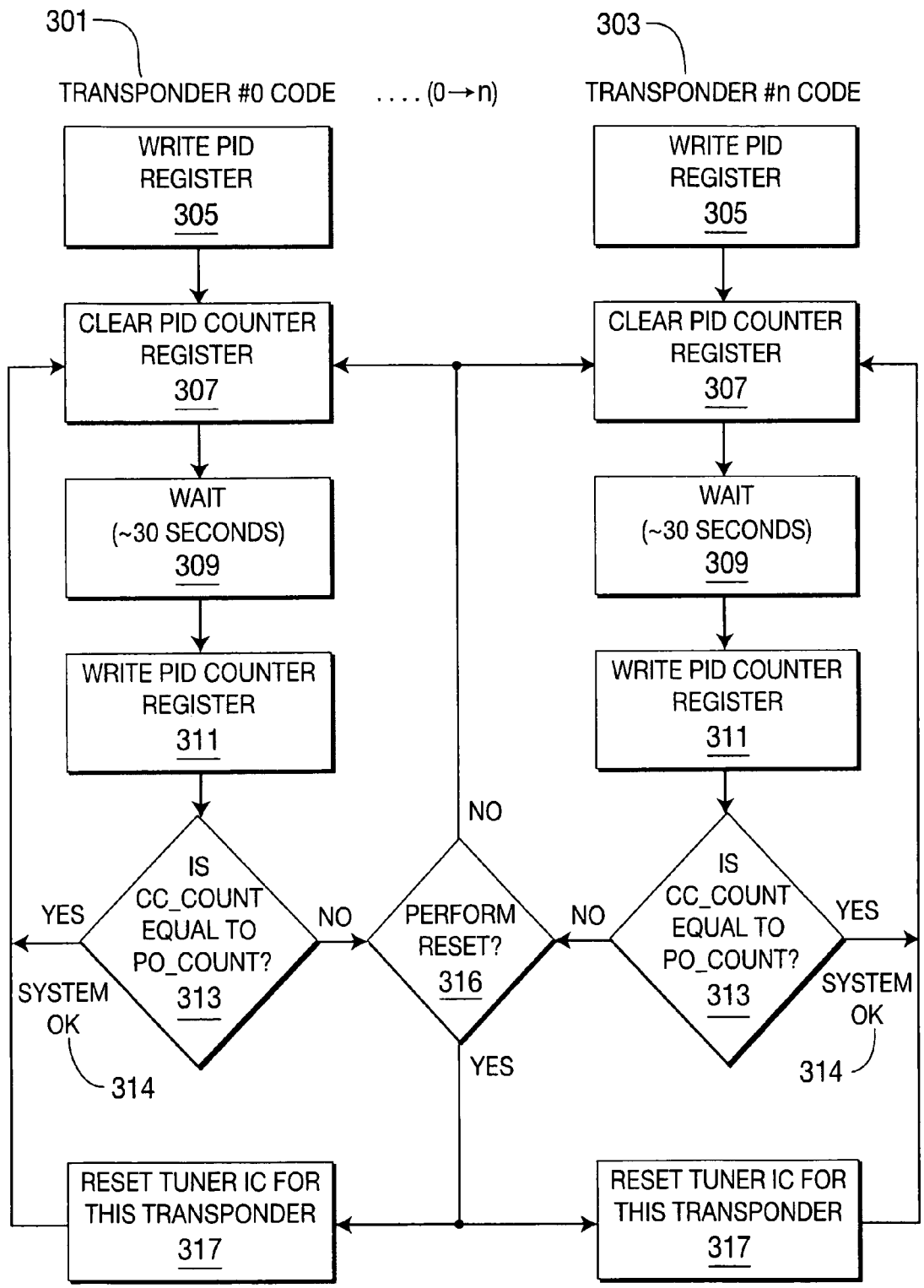
FIG. 3 is an exemplary method flow for using counter results to determine if a valid bitstream is being received in accordance with an aspect of the present principles.

FIG. 3 is an exemplary method flow performed by e.g., comparator module 108 for using counter value results to determine if a valid bitstream is being received in accordance with an aspect of the present principles. This method flow is preferably done for each individual transponder 301, 303, etc. Note that in the example shown in FIG. 3, a problem flag is activated in response to every incidence where the first and second counters 215, 217, respectively, are not equal and it is desired to perform a reset. Preferably, the count values are assessed and compared for a predetermined time interval (discussed above with reference to FIG. 2) before a check of the counter values is performed.

Preferably, the PID Occurrence Counter 215 and the Contiguous CC Counter 217 should always be the same value. That is, the PO count 223 and the CC count 225 should be equal for each incoming marker packet. Typically, this indicates that a received signal is being received properly with no errors. If the PID Occurrence Counter is greater than the Contiguous CC Counter then this may indicate that some packets have been dropped. That is, while it is known that a contiguous sequence of packets was broadcast, a contiguous sequence of packets was not received. Hence, it may advantageously be concluded that there is missing data or dropped data based on this detector's results.

According to an aspect of the present invention, a comparator module 108 may be provided to access the counters 215, 217 with a single read to monitor their status. These two registers can prove that the satellite signal is presently active or not active by providing a comparison of the reported count difference. The comparator module 108 compares the values of the PO Counter 215 and the CC Counter 217 to see, e.g., if they are equal. If neither counter 215, 217 is reporting counts, the satellite signal is not being received. If the PID Occurrence counter 215 reports many counts but the Contiguous CC counter 217 reports fewer counts or zero, the system is most likely streaming data from internal memory but is no longer providing a valid stream. Typically, when the two counters 215, 217 are receiving the same number of counts between the counter reads (i.e., if the PO count is equal to the CC count) is it assumed that a valid signal is present.

In step 305, the PID Register 221 is written, that is, it is defined/determined which PID value is desired to be evaluated. In step 307, the PID Counter Register is preferably cleared (i.e., set to zero). Though not required, clearing the PID Counter Register advantageously reduces starter errors (during system initialization), and allows a time difference to be used to measure the number of PIDs arriving with a specified PID value. For example, a single count error could occur at startup if the CC counter does not have time to be set up with the initial value before the 'CC count+1' is calculated. Knowing the time difference between the reset and the next read of the registers helps to establish the rate at which the packets arrive.

Given a time period such as 30 seconds and a certain rate such as 3 PIDs per second, we could expect a normal count of 10+/−1. If the counters were not reset, the example of 8 bit-counters could change from a count of 255 to 0 as the counter goes from all 1's (1111111) to all 0's (00000000) in an overflow condition during our time interval. This would create an ambiguity in the measured count since a value of 10 or (10+255)=265 would both be read as 10. Advantageously, by resetting the counters at the start, the initial conditions can be known and we can choose the next time we want to sample the counters.

Preferably, a wait period is initiated (step 309). The wait period may be determined based on, e.g., whether the system is in a monitoring mode or a reset mode. Typically, when in a system monitoring mode, a reduced number of checks is desired, whereas in a 'reset mode' (i.e., where a known problem exists, and a reset is desired to be performed) a more frequent number of checks is desirable. For example, as shown in the example of FIG. 3, the wait period is about 30 seconds, after which the PID Counter Register is read (step 311). In step 313 it is determined whether the CC count 225 is equal to the PO count 221. If yes (314) the system is presumed to be operating normally (i.e., a valid bitstream is being received) and the process returns to step 307.

If no, it is determined in decision box 316 whether it is desired to perform a system reset for that particular transponder. Factors influencing whether a reset is desired to be performed include, e.g., a possible initialization reset, a first detection of a problem wherein the problem must be verified, e.g., one or two more times before a reset is issued to reduce the number of system resets, or if a reset has occurred and the counters are reset a few times to verify that the problem has been fixed and no further system resets are required.

If yes, the tuner for that particular transponder is reset (step 317) and the method proceeds back to step 307. If no, the method proceeds directly back to step 307.

Although the embodiment which incorporates the teachings of the present principles has been shown and described in detail herein, those skilled in the art can readily devise many other varied embodiments that still incorporate these teachings. Having described preferred embodiments for a system and method for a satellite transponder monitoring system (which are intended to be illustrative and not limiting), it is noted that modifications and variations can be made by persons skilled in the art in light of the above teachings. For example, although the present principles are described in the context of marker packets and PIDs associated with the marker packets, it is to be understood that that the present principles can be implemented for any selected program having video and/or audio streams with particular PIDs associated therewith, and having continuity counters included within the transport packets. It is therefore to be understood that changes may be made in the particular embodiments of the present principles disclosed which are within the scope and spirit of the present principles as outlined by the appended claims. Having thus described the present principles with the details and particularity required by the patent laws, what is claimed and desired protected by Letters Patent is set forth in the appended claims.

The invention claimed is:

1. A method, comprising:
   receiving a packetized bitstream from one of a plurality of transponders, each packet in the packetized bitstream having a packet identifier associated therewith;
   first counting each occurrence of receiving a packet having a first packet identifier within the packetized bitstream, wherein the first packet identifier is associated with a marker packet associated with one of the plurality of transponders, and includes information identifying the one of the plurality of transponders;
   evaluating a counter value contained in each packet having the first packet identifier;
   second counting each occurrence wherein the evaluated counter value is higher than a most recently evaluated counter value; and
   determining whether a valid bitstream is being received in response to a comparison of the first and second counting.

2. The method according to claim 1, wherein the receiving step comprises receiving the packetized bitstream from one of a plurality of transponders via a processing center associated with a multiple dwelling unit, and further including the step of transmitting a reset signal to the processing center upon determining that a valid bitstream is not being received.

3. The method according to claim 1, wherein the first packet identifier is associated with transport packets associated with a first program stream, and wherein the transport packets include unencrypted data.

4. The method according to claim 1, wherein the received bitstream is determined to be a valid bitstream if the count values from the first and second counting are the same at a particular time.

5. The method according to claim 1, wherein the received bitstream is determined to be a valid bitstream if the count values from the first and second counting are the same over a first time interval.

6. The method according to claim 1, wherein the determining step comprises comparing the count values from the first and second counting over a first time interval, and if the count values differ, comparing the count values from the first and second counting over a second time interval, shorter than the first time interval, and determining that the bitstream is not a valid bitstream if the count values from the first and second counting differ over the second time interval.

7. A receiver, comprising:
   a transport processor receiving a packetized bitstream from one of a plurality of transponders, each packet in the packetized bitstream having a packet identifier associated therewith, the transport processor identifying each occurrence of a packet having a first packet identifier within the packetized bitstream, wherein the first packet identifier is associated with a marker packet associated with one of the plurality of transponders, and includes information identifying the one of the plurality of transponders, the transport processor evaluating a counter value contained in each packet having the first packet identifier;
   a first counter coupled to the transport processor, the first counter incrementing upon each occurrence of receiving a packet having the first packet identifier;
   a second counter coupled to the transport processor, the second counter incrementing each time a currently evaluated counter value is higher than a most recently evaluated counter value;
   comparator coupled to the first and second counters that compares the values stored in the first and second counters; and
   a processor coupled to the comparator, the processor determining whether a valid bitstream is being received in response to the comparison of count values stored in the first and second counters.

8. The receiver according to claim 7, wherein the transport processor receives the packetized bitstream from one of a plurality of transponders via a processing center associated with a multiple dwelling unit, and further including the step of transmitting a reset signal to the processing center upon determining that a valid bitstream is not being received.

9. The receiver according to claim 7, wherein the first packet identifier is associated with transport packets associated with a first program stream, and wherein the transport packets include unencrypted data.

10. The receiver according to claim 7, wherein the received bitstream is determined to be a valid bitstream if the count values from the first and second counting are the same at a particular time.

11. The receiver according to claim 7, wherein the received bitstream is determined to be a valid bitstream if the count values from the first and second counting are the same over a first time interval.

12. The receiver according to claim 7, wherein the processor determines whether the received bitstream is a valid bitstream by comparing the count values from the first and second counting over a first time interval, and if the count values differ, comparing the count values from the first and second counting over a second time interval, shorter than the first time interval, and determining that the bitstream is not a valid bitstream if the count values from the first and second counting differ over the second time interval.

* * * * *